US009401083B2

(12) United States Patent
Liao

(10) Patent No.: US 9,401,083 B2
(45) Date of Patent: Jul. 26, 2016

(54) REMOTE CONTROL SYSTEM FOR ELECTRIC DEVICES, SIGNAL CONVERSION DEVICE, AND CONTROL METHOD FOR SIGNAL CONVERSION DEVICES

(71) Applicant: KYE SYSTEMS CORP., New Taipei (TW)

(72) Inventor: Jui-Tsung Liao, New Taipei (TW)

(73) Assignee: KYE SYSTEMS CORP., New Taipei (TW)

( * ) Notice: Subject to any disclaimer, the term of this patent is extended or adjusted under 35 U.S.C. 154(b) by 133 days.

(21) Appl. No.: 14/274,230

(22) Filed: May 9, 2014

(65) Prior Publication Data

US 2015/0199898 A1 Jul. 16, 2015

(30) Foreign Application Priority Data

Jan. 15, 2014 (TW) ............................. 103101444 A

(51) Int. Cl.

*G05B 11/01* (2006.01)
*G09B 21/00* (2006.01)
*G08B 5/00* (2006.01)
*H04B 10/00* (2013.01)
*F16C 33/10* (2006.01)
*G08C 17/00* (2006.01)
*G08C 17/02* (2006.01)
*G08C 23/04* (2006.01)

(52) U.S. Cl.

CPC ................ *G08C 17/00* (2013.01); *G08C 17/02* (2013.01); *G08C 23/04* (2013.01); *G08C 2201/10* (2013.01); *G08C 2201/40* (2013.01)

(58) Field of Classification Search

CPC .......... A61F 4/00; G08C 19/28; G08C 17/00; G08C 23/04; H04B 10/22; F01M 9/103

USPC ........... 340/4.11, 12.22, 815.6; 398/106, 114; 384/14

See application file for complete search history.

(56) References Cited

U.S. PATENT DOCUMENTS 5,515,052 A * 5/1996 Darbee .................. G08C 19/28 340/12.22
2004/0098481 A1 * 5/2004 Gunji ...................... G06F 21/32 709/225
2004/0160903 A1 * 8/2004 Gai ..................... H04L 12/4645 370/254
2006/0007015 A1 * 1/2006 Krzyzanowski ....... G08C 17/02 340/12.25
2008/0088495 A1 * 4/2008 Kawakita ............... G08C 19/28 341/176

(Continued)

FOREIGN PATENT DOCUMENTS

CN 102591307 B 8/2013

*Primary Examiner* — George Bugg
*Assistant Examiner* — Munear Akki
(74) *Attorney, Agent, or Firm* — Bacon & Thomas, PLLC

(57) ABSTRACT

The invention discloses a remote control system for electric devices, a signal conversion device, and a control method for signal conversion devices. The signal conversion device may control an electric device according to a remote control signal including an identification code and a control command. The signal conversion device may include a wireless receiving module, a control module, and a wireless transmission module. The wireless receiving module may receive the remote control signal. The control module may determine whether the identification code matches a default identification code stored in the signal conversion device, to decide whether to convert the control command to a control signal. The wireless transmission module may transmit the control signal to the electric device such that the electric device operates according to the control signal.

13 Claims, 10 Drawing Sheets

(56) References Cited

U.S. PATENT DOCUMENTS

| | | | | |
|---|---|---|---|---|
| 2008/0180303 | A1 * | 7/2008 | Yamamoto | G08C 23/04 341/176 |
| 2009/0323354 | A1 * | 12/2009 | Ban | H05B 33/0803 362/317 |
| 2010/0146278 | A1 * | 6/2010 | Maier | H04N 5/4403 713/171 |
| 2012/0086563 | A1 * | 4/2012 | Arling | G06F 3/0486 340/12.52 |
| 2013/0088649 | A1 * | 4/2013 | Yum | H04N 21/4108 348/734 |
| 2014/0064735 | A1 * | 3/2014 | Thompson | H04B 10/1149 398/106 |

* cited by examiner

REMOTE CONTROL SYSTEM FOR ELECTRIC DEVICES, SIGNAL CONVERSION DEVICE, AND CONTROL METHOD FOR SIGNAL CONVERSION DEVICES

CROSS-REFERENCE TO RELATED APPLICATIONS

This non-provisional application claims priority under 35 U.S.C. §119(a) on Patent Application No(s). 103101444 filed in Taiwan, R.O.C. on Jan. 15, 2014, the entire contents of which are hereby incorporated by reference.

TECHNICAL FIELD

The disclosure relates to a remote control system for electric devices, a signal conversion device, and a control method for signal conversion devices, more particularly to a remote control system for electric devices, a signal conversion device, and a control method for signal conversion devices, all of which are capable of performing peer to peer (P2P) control on all electric devices.

BACKGROUND

Recently, most household electric devices supporting remote control (e.g. air conditioners and televisions) usually perform remote control process with infrared ray signals. For different types of electric devices, remote control signals generated by remote controllers are usually encoded in different ways.

When a user intends to control the operation of a certain electric device, the user has to search for a proper remote controller out of many remote controllers, resulting in inconvenient operational experiences. To solve this problem, relative manufacturers nowadays propose remote controllers with a learning model capable of memorizing coding schemes of different remote controllers, or propose application programs to be installed in mobile devices to control different types of electric devices.

For the remote controllers with a learning model, the cost is higher. Also, since the human machine interface for such remote controllers have been defined and been constant, users can not define the control functions or procedures according to their preference. Sometimes there are more than two electric devices having the same coding scheme for remote control signals or having the same type in a house. In this case, whenever a user intends to control one of these electric devices, other one of these electric devices may easily be controlled accidentally. Alternately, sometimes there is a plurality of different types of electric devices in a house. In this case, since there may be one or more electric devices using the same coding scheme in these electric devices, the above mentioned accidental control may easily occur.

SUMMARY

According to one or more embodiments, the disclosure provides a remote control system. In one embodiment, the remote control system may include a remote electric device and at least one signal conversion device. The remote electric device may send out a remote control signal carrying an identification code and a control command. The at least one signal conversion device may include a wireless receiving module, a control module, and a wireless transmission module. The wireless receiving module may receive the remote control signal. The control module may electrically connect to the wireless receiving module and determine whether the identification code matches a default identification code stored in the at least one signal conversion device, to decide whether to convert the control command into a control signal. The wireless transmission module may electrically connect to the control module and send the control signal to an electric device. Therefore, the electric device may operate according to the control signal.

According to one or more embodiments, the disclosure provides a signal conversion device. In one embodiment, the signal conversion device may control an electric device according to a remote control signal including an identification code and a control command, and include a wireless receiving module, a control module, and a wireless transmission module. The wireless receiving module may receive the remote control signal. The control module may electrically connect to the wireless receiving module and determine whether the identification code matches a default identification code stored in the signal conversion device, to decide whether to convert the control command to a control signal. The wireless transmission module may electrically connect to the control module and send the control signal to the electric device. Therefore, the electric device may operate according to the control signal.

According to one or more embodiments, the disclosure provides a control method for controlling an electric device via at least one signal conversion device. In one embodiment, the control method may include the following steps. First, receive a remote control signal carrying an identification code and a control command. Then, determine whether the identification code matches a default identification code stored in the at least one signal conversion device, to decide whether to convert the control command to a control signal. Finally, send the control signal to the electric device. Therefore, the electric device may operate according to the control signal.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
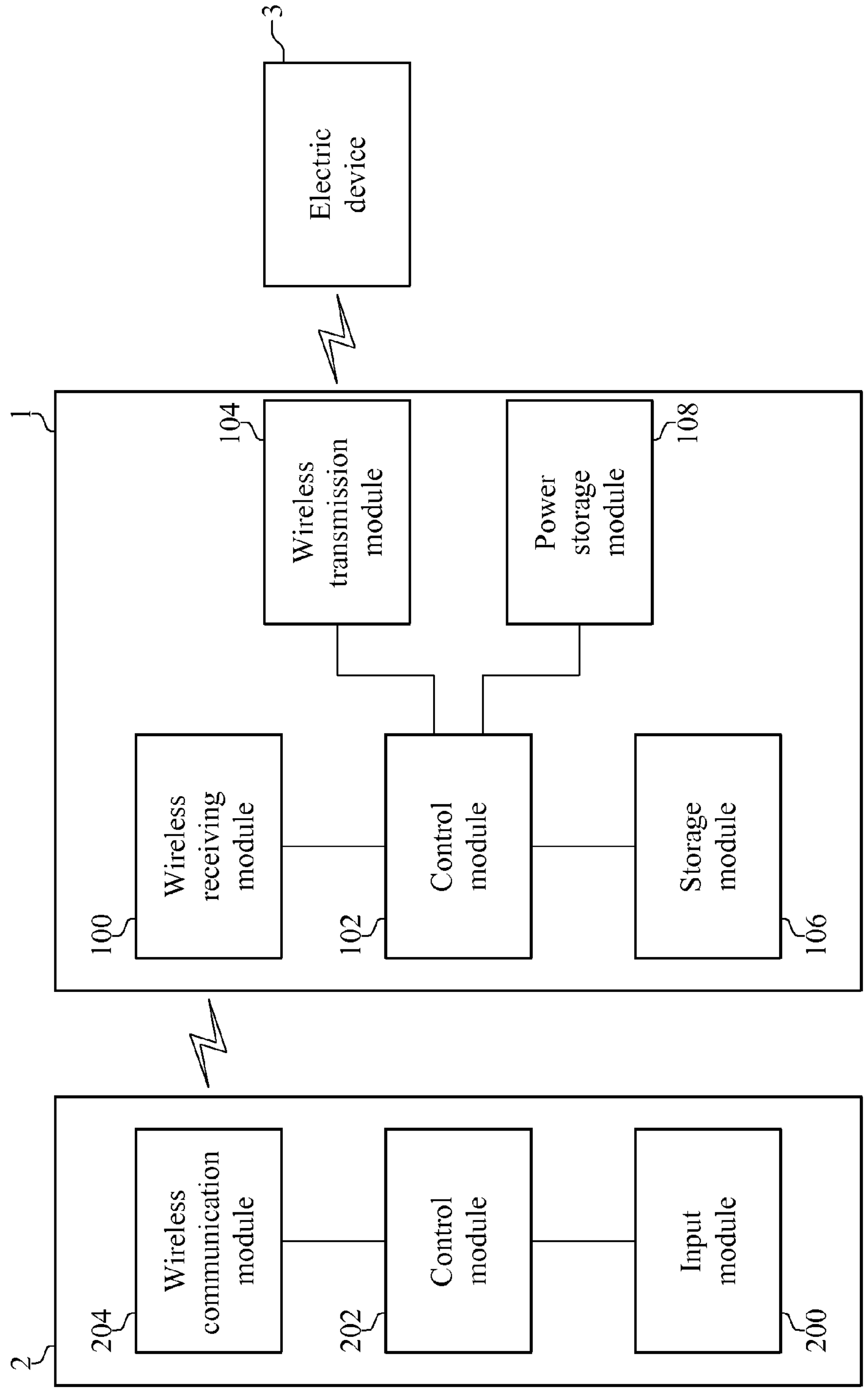
FIG. 1 is a block diagram of a remote control system for electric devices according to one of the embodiments in the disclosure.

FIG. 1 is a block diagram of a remote control system for electric devices according to one of the embodiments in the disclosure. The remote control system may include one or more signal conversion devices 1, a remote electric device 2, and one or more electric devices 3, and the signal conversion device 1 may predeterminedly correspond to the electric device 3. The electric device 3 may include a wireless receiver. The disclosure does not have any limitation on the number of electric devices 3 and the number of signal conversion devices 1, but in order to clearly illustrate the operation of the remote control system, the following one or more embodiments may take one signal conversion device 1 and one electric device 3.

The signal conversion device 1 may include a wireless receiving module 100, a control module 102, a wireless transmission module 104, a storage module 106, and a power storage module 108. The control module 102 may electrically connect to the wireless receiving module 100, the wireless transmission module 104, the storage module 106, and the power storage module 108.

The remote electric device 2 may include an input module 200, a control module 202, and a wireless communication module 204, and the control module 202 may electrically connect to the input module 200 and the wireless communication module 204. The remote electric device 2 may be an electric device capable of remote control, so that the remote electric device 2 may send the signal conversion device 1*a* remote control signal. In one or more embodiments, the remote electric device 2 may be a remote controller for the exclusive use of the signal conversion device 1, or be a mobile device e.g. a smart phone or a tablet computer, which is installed with a mobile application (or called App) to control the signal conversion device 1, but the disclosure will not be limited thereto. The detailed operation of each module in the remote electric device 2 is illustrated below.

The input module 200 may allow users to input an identification code (ID code) and a control command. The identification code may be used for enabling the wireless transmission module 104 in the signal conversion device 1, and the control command may define the operation of the electric device 3. Take a television as an example of the electric device 3. In this case, the control command may be an on/off command, a channel selection command, or an output volume setting command to control the television. Take an air conditioner as an example of the electric device 3. In this case, the control command may be an on/off command, a temperature setting command, a fan speed setting command, or a clock setting command to control the air conditioner. For example, the input module 200 may be a control knob, buttons, or a touch panel for users to manually input the identification code and the control command. Moreover, the input module 200 may be a microphone allowing users to input the identification code and the control command with voices.

The control module 202 may combine and encode the above identification code and the above control command to generate the above remote control signal. The wireless communication module 204 may send out the remote control signal by a wireless communication protocol. This wireless communication protocol for the wireless communication module 204 may be an infrared ray (IR) protocol, a Bluetooth protocol, a Zigbee protocol, a WiFi protocol, or a 2.4G radio frequency (RF) protocol, but the disclosure will not be limited thereto.

In one exemplary embodiment, while the remote electric device 2 as a smart phone sends the remote control signal under the IR protocol, the wireless communication module 204 may be an external IR transmitter whose connector may be removable and disposed in an audio port (e.g. 3.5 mm audio port), an universal serial bus interface (USB) interface (e.g. a micro USB interface), or an exclusive connection interface (e.g. Lightning interface) created by Apple Inc. of the smart phone. In one exemplary embodiment, while the remote electric device 2 as a smart phone sends the remote control signal under the Zigbee protocol or 2.4G RF protocol, the wireless communication module 204 may be an external wireless signal transmitter whose connector may be removable and disposed in an exclusive connection interface created by Apple Inc. or an USB interface of the smart phone. In one exemplary embodiment, while the remote electric device 2 as a smart phone sends the remote control signal under the Bluetooth protocol or the WiFi protocol, the wireless communication module 204 may be a communication chip inbuilt in the smart phone.

The signal conversion device 1 may be a controller triggering or driving the operation of the electric device 3. In one embodiment, the signal conversion device 1 may take away from the electric device 3. For example, the signal conversion device 1 may be pasted on the casing of the electric device 3 or be disposed on the casing via a fastening structure, but the disclosure will not be limited thereto. The detailed operation of each module in the signal conversion device 1 is illustrated below.

Since the wireless receiving module 100 may be a wireless receiver whose wireless communication protocol matches the wireless communication protocol of the wireless communication module 204 in the remote electric device 2, the wireless receiving module 100 may receive the remote control signal from the wireless communication module 204. Therefore, the wireless communication protocol of the wireless receiving module 100 may be an IR protocol, a Bluetooth protocol, a Zigbee protocol, a WiFi protocol, or a 2.4G RF protocol, but the disclosure will not be limited thereto.

The control module 102 may determine whether the identification code carried by the remote control signal matches a default identification code stored in the signal conversion device 1, to decide whether to convert the control command carried by the remote control signal to a control signal. When the identification code matches the default identification code, the control module 102 may look up a suitable control signal for the electric device 3 in a lookup table according to the control command, to convert the control command to this control signal. Otherwise, when the identification code does not match the default identification code, because of determining that this remote control signal is not provided to drive or trigger the electric device 3, the control module 102 may stay in an idle state until the wireless receiving module 100 receives another remote control signal.

The wireless transmission module 104 may send the above control signal to the electric device 3 by a wireless communication protocol, whereby the electric device 3 may operate according to the control signal. The wireless communication protocol for the wireless transmission module 104 has to match the wireless communication protocol for the wireless receiver in the electric device 3. The wireless communication protocol for the wireless transmission module 104 may be an IR protocol, a Bluetooth protocol, a Zigbee protocol, a WiFi protocol, or a 2.4G RF protocol, but the disclosure will not be limited thereto. In one exemplary embodiment, if the electric device 3 is an air conditioner with an IR protocol, the wireless transmission module 104 may be an IR transmitter. In other exemplary embodiment, if the electric device 3 is a smart television with an IR protocol and a WiFi protocol, the wireless transmission module 104 may be an IR transmitter, a WiFi transmitter, or a combination thereof.

The storage module 106 may store the above default identification code and the above lookup table. The lookup table may record the relationship between a control command, which is carried by each remote control signal sent by the remote electric device 2, and a control signal sending to the electric device 3. Furthermore, the signal conversion device 1 may be capable of updating or editing one or more default identification codes and one or more lookup tables stored in the storage module 106 via the wireless receiving module 100. The storage module 106 may be one or more programmable read-only memories (PROM), one or more erasable programmable read-only memories (EPROM), one or more electrically erasable programmable read-only memories (EEPROM), one or more flash memories, or any possible non-volatile memory, but the disclosure will not be limited thereto.

The power storage module 108 may power the modules except itself in the signal conversion device 1. The power storage module 108 may be one or more primary batteries or one or more rechargeable batteries, but the disclosure will not be limited thereto. In addition, while the power storage module 108 is a rechargeable battery, the signal conversion device 1 may further include a charger module which may electrically connect to the power storage module 108 and charge the power storage module 108 with external power received from an external power source. Therefore, without removing the casing of the signal conversion device 1, the signal conversion device 1 may directly charge the power storage module 108.

Figure 2:
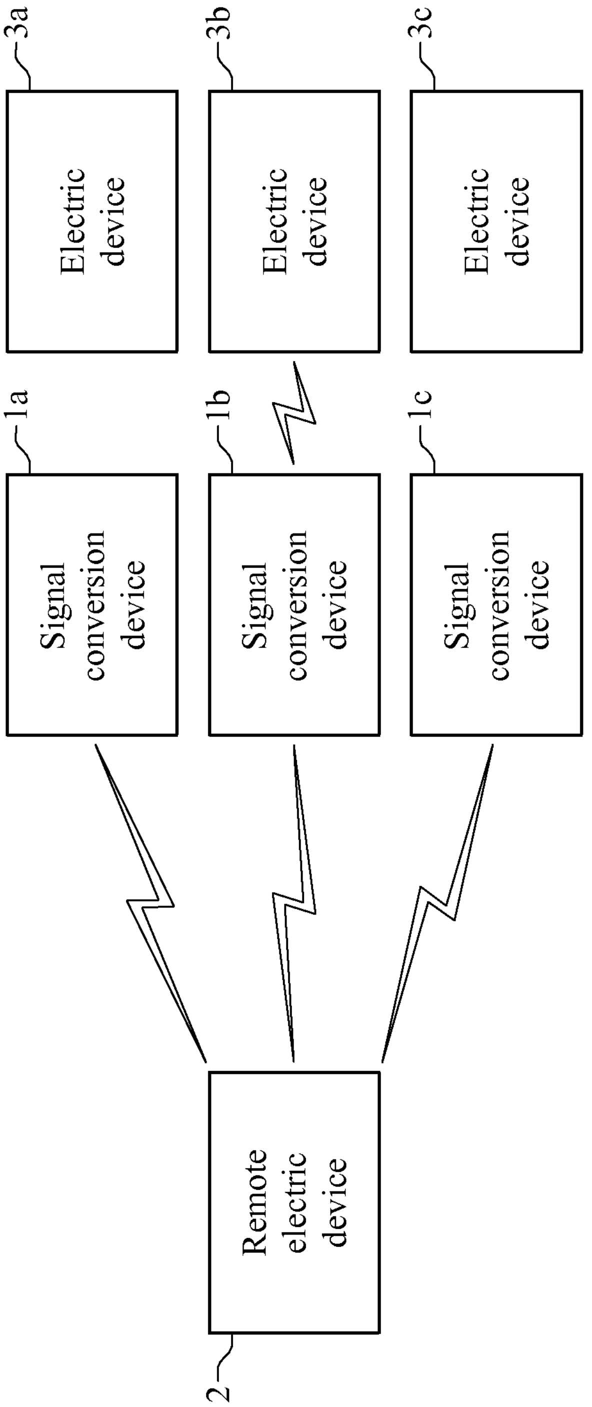
FIG. 2 is a schematic view of operating the remote control system according to one of the embodiments in the disclosure.

In the following one or more embodiments, the detailed operation of the above remote control system in FIG. 1 is described. FIG. 2 is a schematic view of operating the remote control system according to one embodiment. The remote control system may include three signal conversion devices 1*a* to 1*c*, a remote electric device 2, and three electric devices 3*a* to 3*c*. The signal conversion device 1*a* may predeterminedly correspond to the electric device 3*a* and store a first default identification code, the signal conversion device 1*b* may predeterminedly correspond to the electric device 3*b* and store a second default identification code, and the signal conversion device 1*c* may determinedly correspond to the electric device 3*c* and store a third default identification code.

When intending to control the electric device 3*b*, a user may, via the input module 200 in the remote electric device 2, input an identification code matching the second default identification code, and a control command specifying a specific action to the electric device 3*b*. Then, the wireless communication module 204 may send a remote control signal carrying the inputted identification code and the inputted control command to the signal conversion device 1*a*, the signal conversion device 1*b*, and the signal conversion device 1*c*.

Since the signal conversion device 1*a* and the signal conversion device 1*c* may determine that the identification code carried by the remote control signal does not match their default identification code (i.e. the first default identification code and the third default identification code), the signal conversion device 1*a* and the signal conversion device 1*c* may not convert the control command. In contrast, since the signal conversion device 1*b* may determine that the identification code matches its second default identification code (i.e. the second default identification code), the signal conversion device 1*b* may convert the control command to a control signal available for the wireless transmission module 104.

Finally, the wireless transmission module 104 in the signal conversion device 1*b* may send the electric device 3*b* the control signal, whereby the electric device 3*b* may operate according to the control signal.

In one embodiment, when there is a default identification code shared with two of the signal conversion devices 1 in the remote control system, the user may be allowed to simultaneously control two of the electric devices 3 respectively corresponding to the two signal conversion devices 1 in the remote control system.

On the other hand, since wireless signals in their transmission process may be decayed by the effect of transmission distance or be easily blocked, remote control signals may not successfully be sent from the remote electric device 2 to one or more signal conversion devices 1 which correspond to one or more electric device 3 to be controlled. Moreover, if the remote control signal sent by the remote electric device 2 is an IR signal which travels along a specific direction, the wireless communication module 204 in the remote electric device 2 needs to face the wireless receiving module 100 in the signal conversion device 1 corresponding to one electric device 3 to be controlled, resulting in being inconvenient to use.

Figure 3:
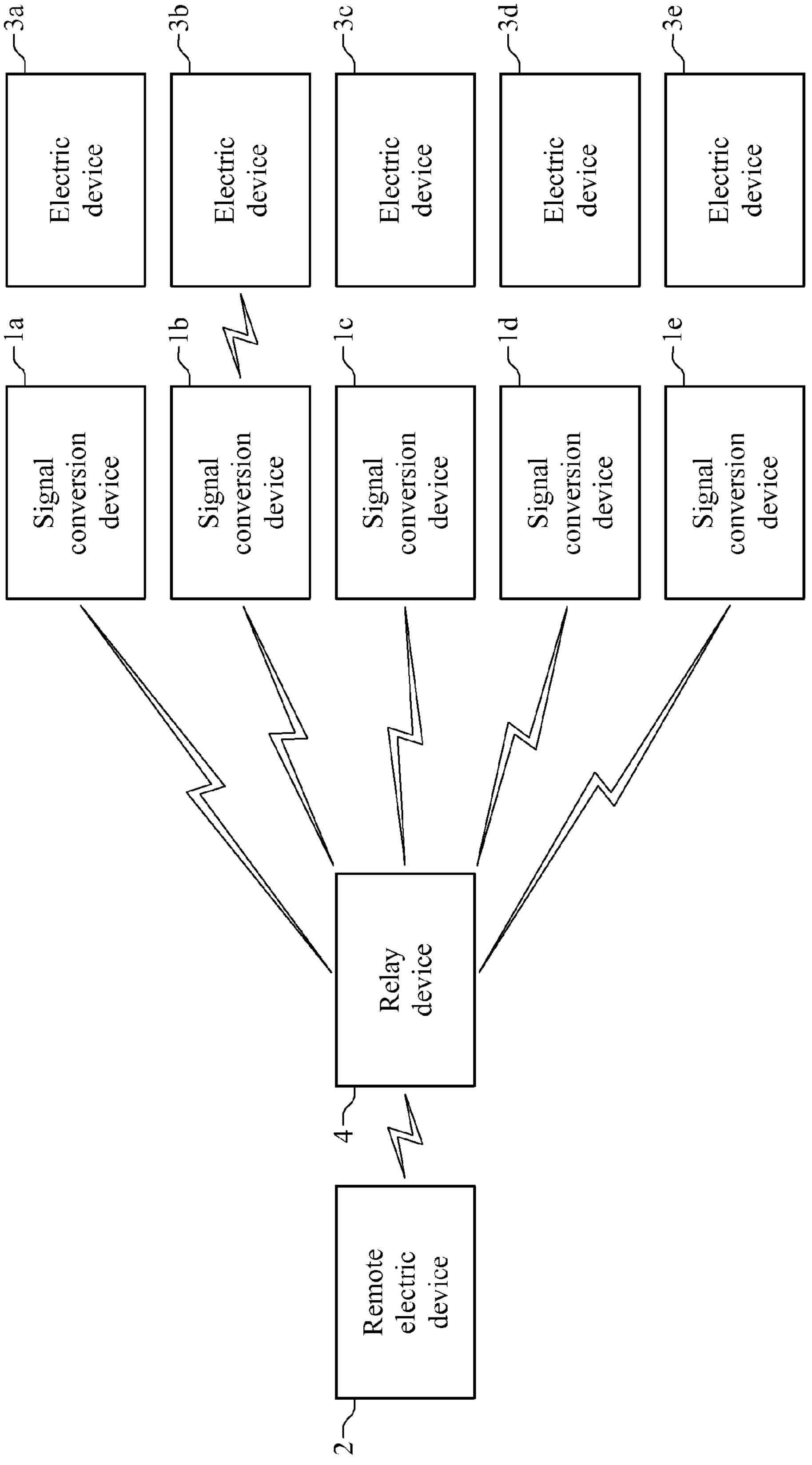
FIG. 3 is a schematic view of operating the remote control system according to another one of the embodiments in the disclosure.

To solve the above problems, the remote control system in one embodiment may further include a relay device, as shown in FIG. 3. FIG. 3 is a schematic view of operating the remote control system according to another one of the embodiments in the disclosure. A wireless communication module in the relay device may be capable of receiving wireless signals from or transmitting wireless signals to all signal conversion devices in the remote control system. In other words, the relay device may be a transceiver with an ultra-wide region to transmitting and receiving signals. The remote control system may further include a relay device 4. The relay device 4 may receive remote control signals from the remote electric device 2, and then broadcast the remote control signal to all signal conversion devices (i.e. the signal conversion devices 1*a* to 1*e*) in the remote control system by one aforementioned wireless communication protocol.

Therefore, if the remote control signal sent by the wireless communication module 204 in the remote electric device 2 is an IR signal, and the transmission direction of this IR signal emitted by the remote electric device 2 is random, the remote electric device 2 may be able to control all of the electric devices 3 in the remote control system. In one embodiment, the relay device 4 may be disposed in a region (e.g. the ceiling) without hindrances in the remote control system. In one embodiment, the power source of the relay device 4 may be a battery, a rechargeable battery, or mains electricity by country, but the disclosure will not be limited thereto. Also, the disclosure does not have any limitation on the number of relay device 4 in the remote control system. In other words, the remote control system may use a plurality of relay devices 4 to enlarge the control region available for the remote electric device 2, and the relay device 4 may only receive the remote control signals from the remote electric device 2 and other relay devices 4.

Figure 4A:
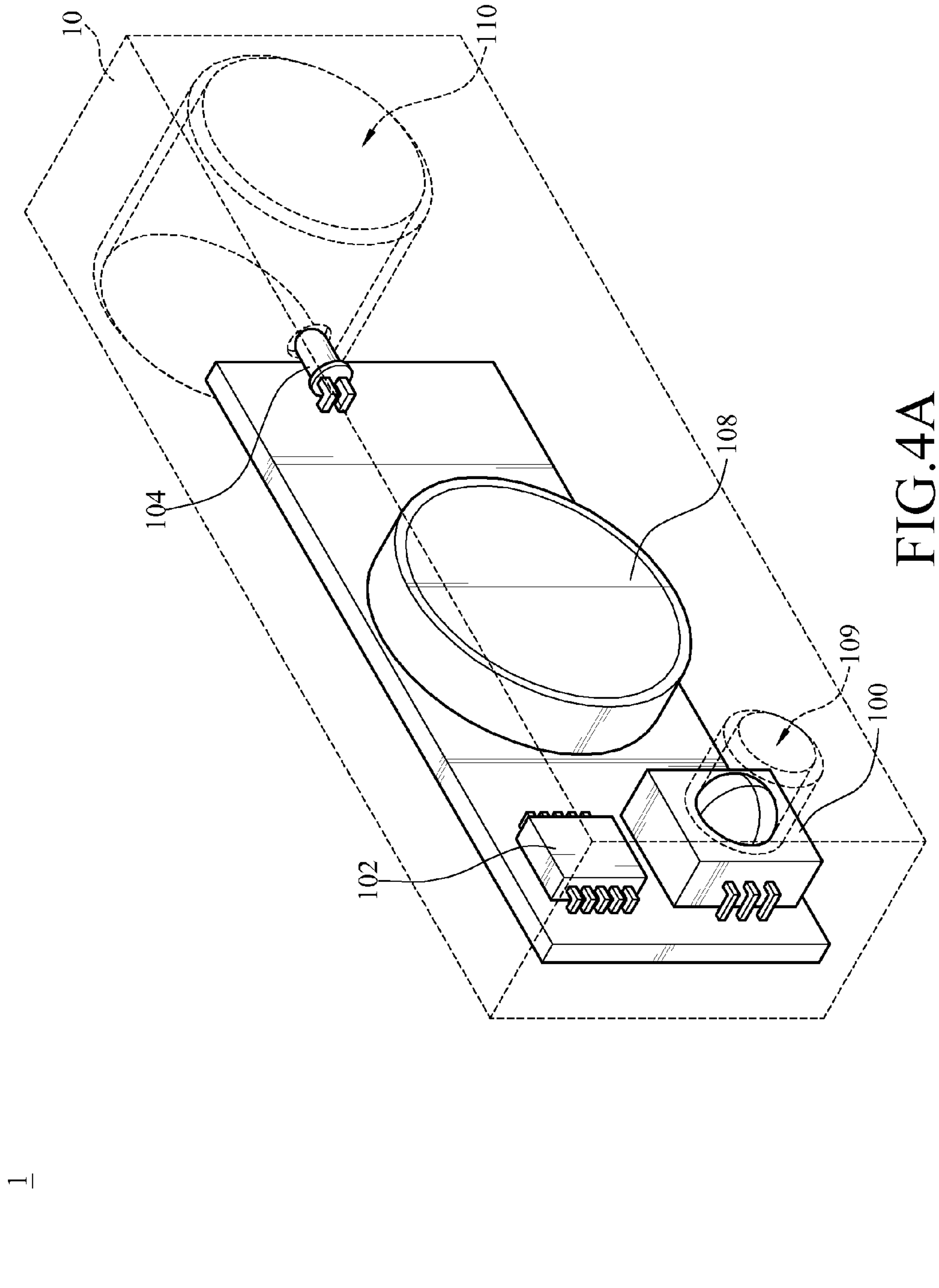
FIG. 4A is a schematic structure diagram of the signal conversion device according to one of the embodiments in the disclosure.

FIG. 4A is a schematic structure diagram of a signal conversion device 1 according to one of the embodiments in the disclosure. The signal conversion device 1 may simply be figured to show a basic structure in which there are only elements related with the disclosure, and since the number, shape, size of each element in FIG. 4A may be designed according to actual requirements, and the arrangement of these elements may become more complicated than the arrangement in FIG. 4A.

In FIG. 4A, the signal conversion device 1 may be a card capable of being pasted on a certain surface, and there are a wireless receiving module 100, a control module 102, a wireless transmission module 104, and a power storage module 108 disposed on a circuit board inside the casing 10 of the signal conversion device 1. In one embodiment, the wireless receiving module 100 may be an IR receiver, the control module 102 may be a microcontroller capable of computing, processing, and storing data, the wireless transmission module 104 may be an IR transmitter, the power storage module 108 may be a lithium button battery. Since the wireless receiving module 100 and the wireless transmission module 104 in the signal conversion device 1 in FIG. 4A are respectively an IR receiver and an IR transmitter, the signal conversion device 1 may have to cooperate with the remote electric device 2 including an IR transmitter and with the electric device 3 including an IR receiver.

Generally, the IR signal has directionality and a shorter transmission distance. In one embodiment, an opening 109 may be formed on the casing 10 and the location of the opening 109 may correspond to the wireless receiving module 100. Through the opening 109, the wireless receiving module 100 in the signal conversion device 1 may receive the remote control signal sent by the IR transmitter in the remote electric device 2. Nevertheless, the opening 109 may be unnecessarily formed. In one embodiment, the casing 10 may be made of light-transmissive material, whereby without the opening 109, the wireless receiving module 100 in the signal conversion device 1 may directly receive the remote control signal sent by the IR transmitter in the remote electric device 2 through the casing 10. Moreover, the casing 10 of the signal conversion device 1 may have a through-hole 110 whose location corresponds to the location of the IR receiver in the electric device 3, and the IR receiver in the electric device 3 may be exposed in the through-hole 110.

Figure 4B:
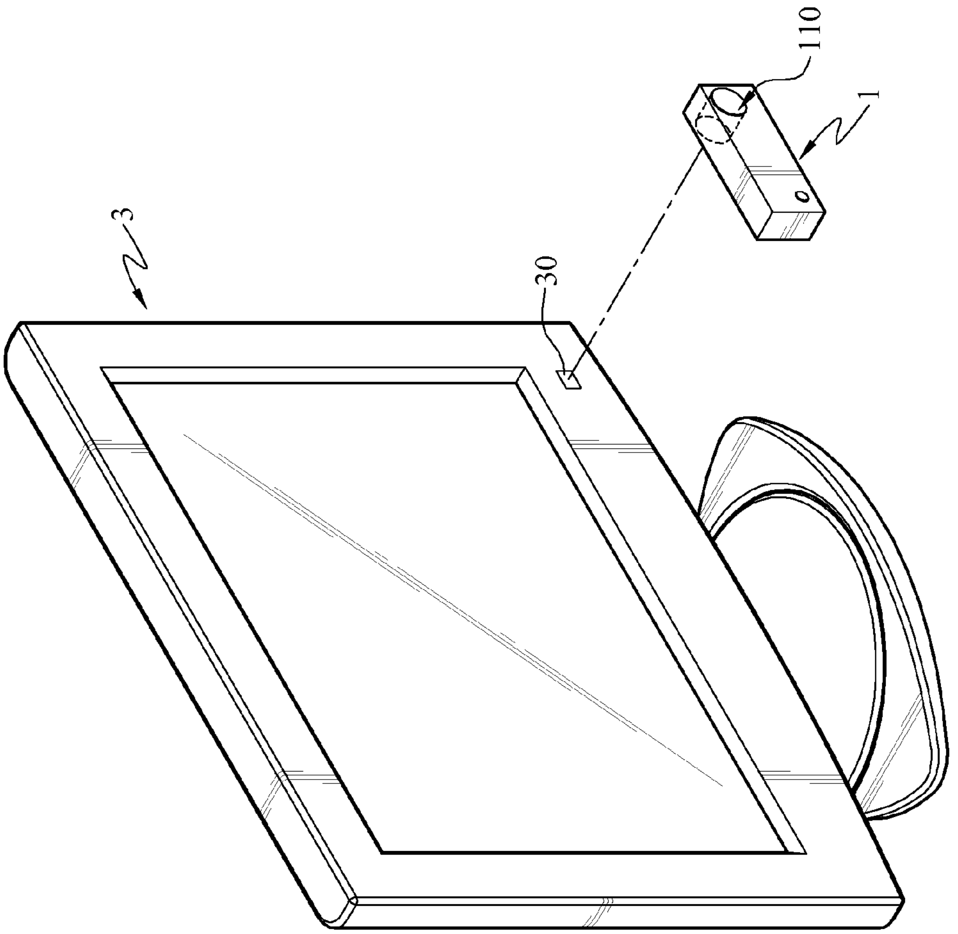
FIG. 4B and FIG. 4C are schematic views of installing the signal conversion device in FIG. 4A on the electric device according to one of the embodiments in the disclosure.
Figure 4C:
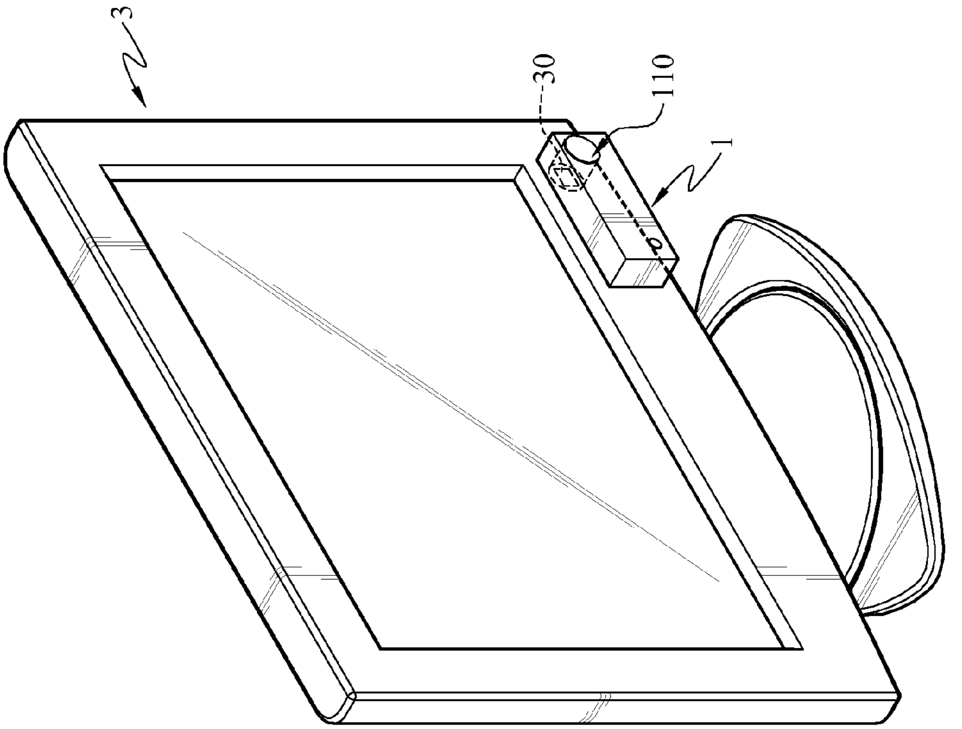

Referring to FIG. 4B and FIG. 4C, schematic views of installing the signal conversion device 1 in FIG. 4A on the electric device according to one of the embodiments in the disclosure are shown. When the signal conversion device 1 is being fixed on the electric device 3, e.g. a television as shown in FIG. 4A, the through-hole 110 of the signal conversion device 1 may be aligned with the IR receiver 30 in the electric device 3, so that the IR receiver 30 in the electric device 3 may be exposed in the through-hole 110. Subsequently, after a sticker pasted on a certain surface of the casing 10 of the signal conversion device 1 is removed, the signal conversion device 1 may be pasted on or bonded to the casing 10 of the electric device 3, as shown in FIG. 4C. Therefore, via the through-hole 110 on the casing 10 of the signal conversion device 1, the signal conversion device 1 may be installed and positioned on the electric device 3 more easily. Moreover, since the IR receiver 30 in the electric device 3 is exposed in the through-hole 110, the user may be able to control the electric device 3 via the remote controller pertaining to the electric device 3.

Figure 4D:
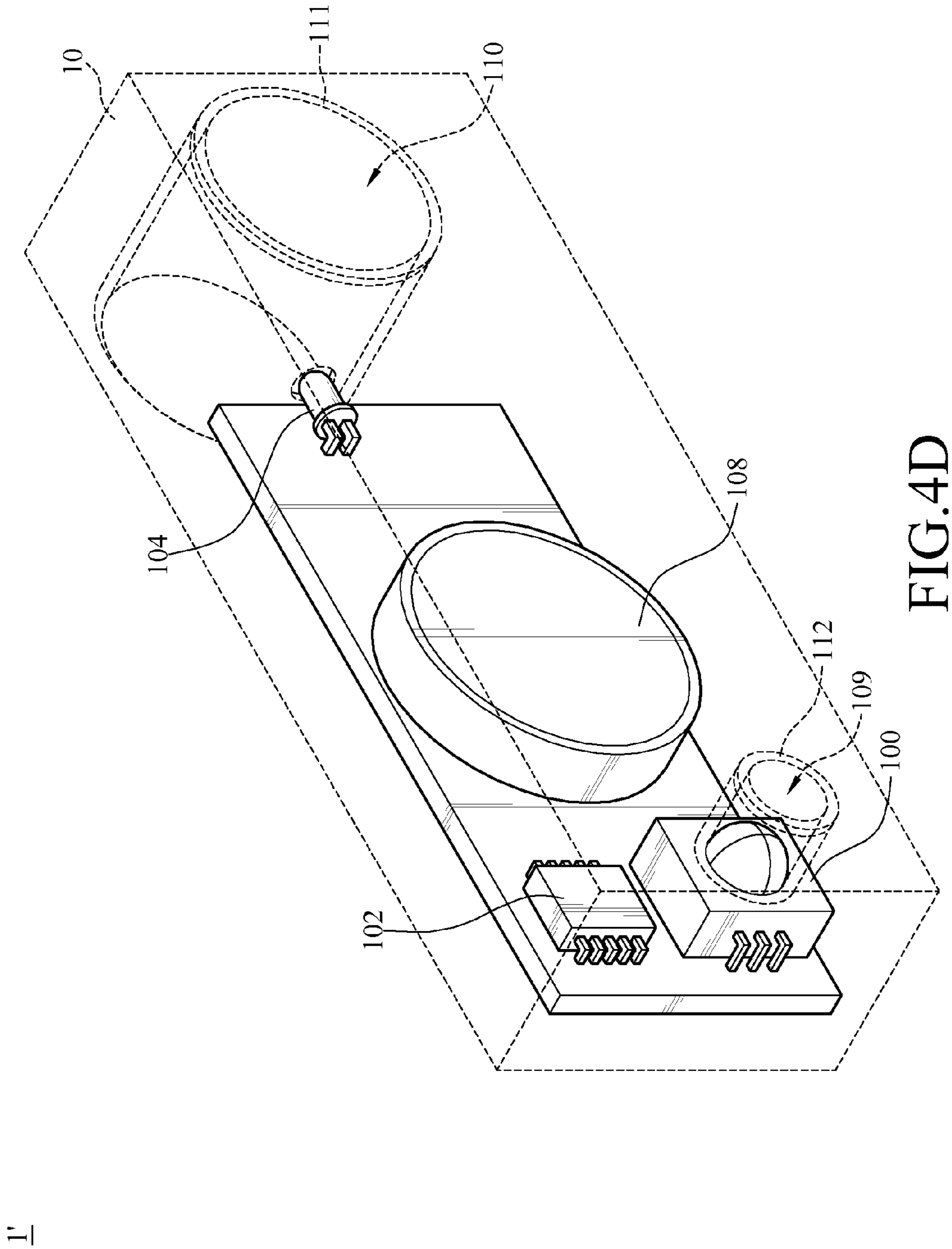
FIG. 4D is a schematic structure diagram of the signal conversion device according to another one of the embodiments in the disclosure.

In one embodiment, one or more light-transmissive films may cover on at least one surface of the casing 10 of the signal conversion device 1 whose location corresponds to the location of the through-hole 110. FIG. 4D is a schematic structure diagram of the signal conversion device according to another one of the embodiments in the disclosure. Compared with the signal conversion device 1 in FIG. 4A, there are a light-transmissive film 111 and a light-transmissive film 112 whose locations respectively correspond to the through-hole 110 and the opening 109 of the casing 10 of the signal conversion device 1' in FIG. 4D. Specifically, the light-transmissive film 111 may cover on the through-hole 110, and the light-transmissive film 112 may cover on the opening 109. The light-transmissive film 111 and the light-transmissive film 112 may allow IR signals to pass through them, as well as prevent the performance of internal electric components in the signal conversion device 1' from being affected by the accumulation of dust. In addition, because of the signal conversion device 1' capable of being bounded to the casing of the electric device 3, it may be unnecessary to form the light-transmissive film 111 on the opens of the through-hole 110 of the casing of the electric device 3. In one embodiment, there is not any limitation on the material and fabrication method of the light-transmissive film 111 and the light-transmissive film 112 formed on the casing in the disclosure.

Figure 4E:
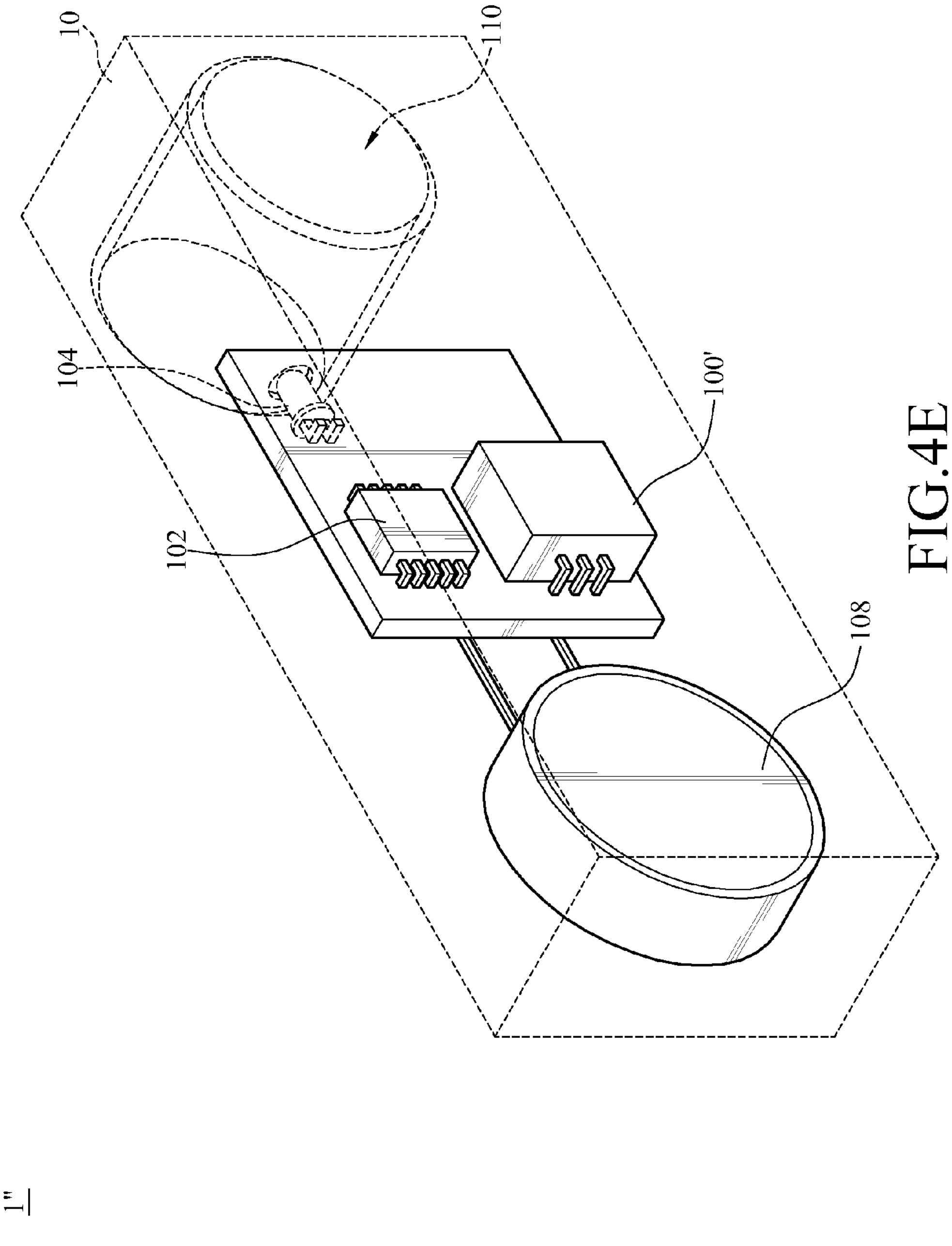
FIG. 4E is a schematic structure diagram of the signal conversion device according to another one of the embodiments in the disclosure.

FIG. 4E is a schematic structure diagram of the signal conversion device 1" according to another one of the embodiments in the disclosure. The signal conversion device 1" may be a card capable of being pasted on a certain surface, and there may be a wireless receiving module 100', a control module 102, and a wireless transmission module 104 disposed on a circuit board inside the casing 10 of the signal conversion device 1". In one embodiment, a power storage module 108 in the signal conversion device 1" may not disposed on the circuit board but electrically connect to the circuit board via two connection lines, whereby the area of the circuit board in the signal conversion device 1" may be reduced to reduce the manufacturing costs. In one embodiment, the wireless receiving module 100' may be a wireless receiver with the Bluetooth protocol, the Zigbee protocol, the WiFi protocol, and the 2.4G RF protocol whereby it may be unnecessary to form a opening 109 as shown in FIG. 4A on the casing 10 of the signal conversion device 1" in FIG. 4E. In one embodiment, the wireless transmission module 104 in FIG. 4E may be an IR transmitter which may be disposed on one side of the circuit board opposite to one side of the circuit board where the wireless receiving module 100' and the control module 102 are disposed.

In one embodiment, the signal conversion device 1 may have recorded all operation commands, which are sent by the remote controller to the one or more electric devices 3 of one or more brands, in the storage module 106 in advance. In one embodiment, the signal conversion device 1 may enter a learning model to store the one or more operation commands, which are sent by the remote controller to the electric device 3 of a certain brand, in the storage module 106. In one embodiment, users may assign the authority to control the remote electric device 2 to other remote electric devices capable of remote control, or may share one or more self-defined remote control procedures of one or more electric devices 3 with another specific user. In one embodiment, the remote electric device 2, a mobile device, may employ the wireless communication module 204 to update its own identification code and update the default identification code stored in the signal conversion device 1, or to update the version of mobile application, user interface (UI), and graphical user interface (GUI) of the remote electric device 2.

Figure 5:
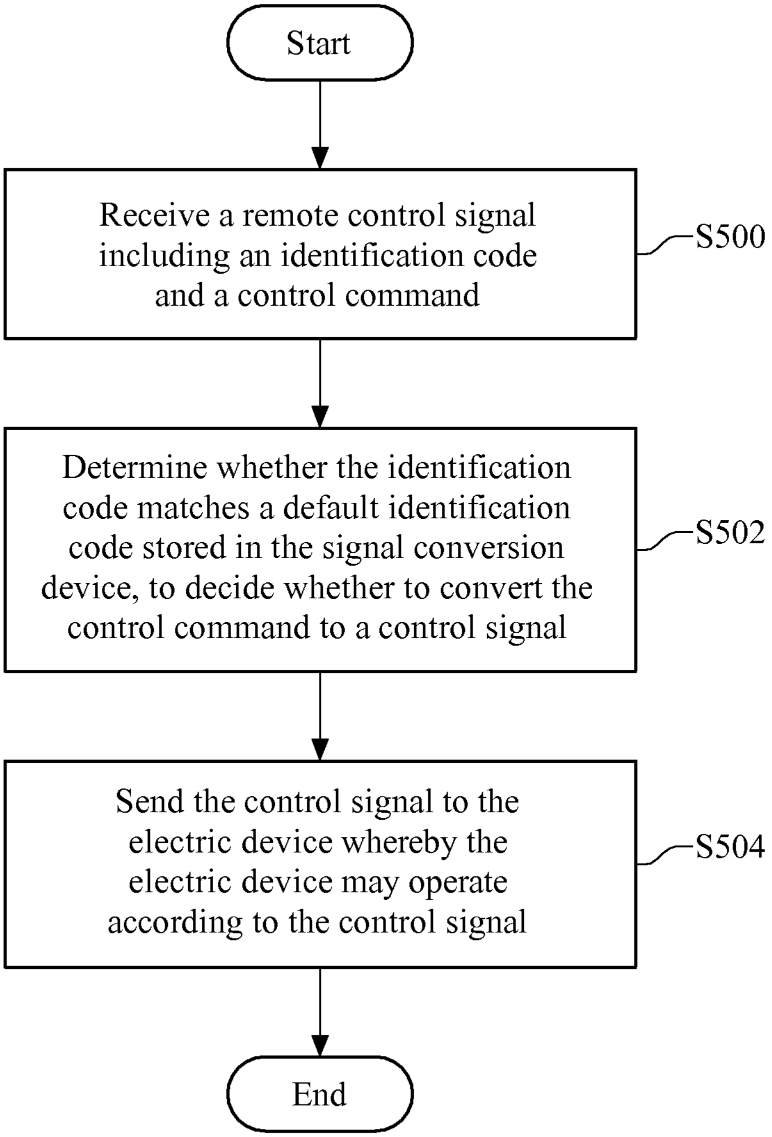
FIG. 5 is a flow chart of a control method for the signal conversion device according to one of the embodiments in the disclosure.

FIG. 5 is a flow chart of a control method for the signal conversion device according to one of the embodiments in the disclosure. The control method may be applied to control one or more electric devices via one or more signal conversion devices. To clearly describe the detailed control method, a single signal conversion device 1 and a single electric device 3 as shown in FIG. 1 may be taken as an exemplary embodiment. As shown in step S500, the signal conversion device 1 may receive the remote control signal from the remote electric device 2, and the remote control signal may include an identification code and a control command. As shown in step S502, the signal conversion device 1 may determine whether the received identification code matches a default identification code stored in the signal conversion device 1, to decide whether to convert the received control command to a control signal. As shown in step S504, the signal conversion device 1 may send the control signal to the electric device 3, whereby the electric device 3 may operate according to the control signal.

Figure 6:
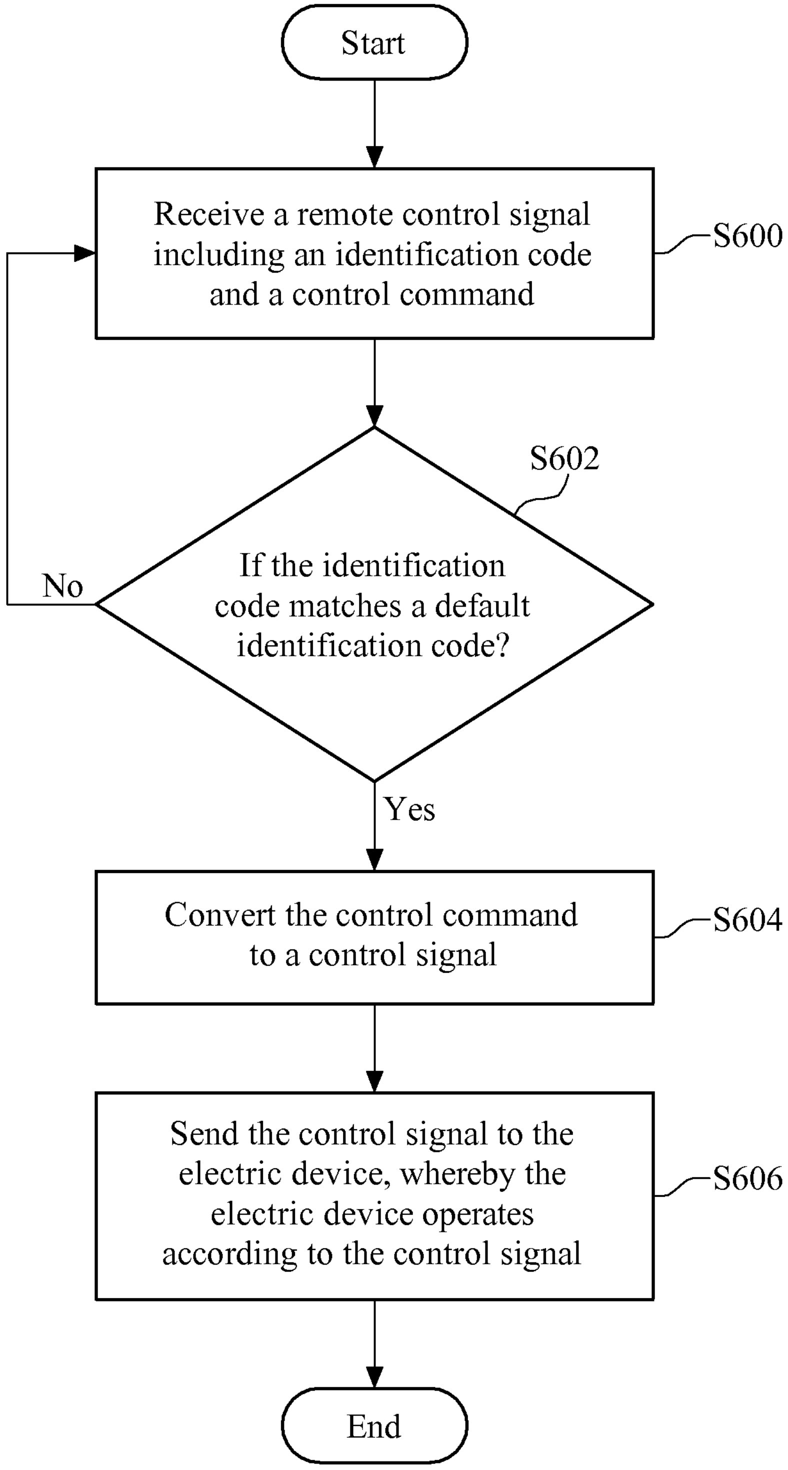
FIG. 6 is a flow chart of a control method for the signal conversion device according to another one of the embodiments in the disclosure.

The detailed operation of the signal conversion device 1 in the above control method shown in FIG. 5 may be referred to the description related to FIG. 6 according to one or more embodiments. As shown in step S600, the signal conversion device 1 may receive the remote control signal from the remote electric device 2, and the remote control signal may include the identification code and the control command.

As shown in step S602, the signal conversion device 1 may determine whether the received identification code matches the default identification code stored in the signal conversion device 1. When the received identification code matches the default identification code, the signal conversion device 1 may convert the control command carried by the remote control signal to the control signal, as shown in step S604. Otherwise, when the received identification code does not match the default identification code, the signal conversion device 1 may send the control signal to the electric device 3 and then the electric device 3 may operate according to the control signal, as shown in S606.

In one embodiment, the signal conversion device 1 may be removable and be disposed on the electric device 3. In one embodiment, as shown in FIG. 4A, the control signal may be an infrared ray signal, the casing 10 of the signal conversion device 1 may have a through-hole 110, the location of the through-hole 110 may correspond to or aim at the location of the IR receiver of the electric device 3, and the IR receiver of the electric device 3 may be exposed in the through-hole 110. In one embodiment, as shown in FIG. 4D, there may be a light-transmissive film 111 covering at the location of at least one surface of the casing 10 of the signal conversion device 1 corresponding to the location of the through-hole 110. In one embodiment, when the signal conversion device 1 is receiving the remote control signal (step S500 or step S600), at least one relay device 4 may send the remote control signal to all signal conversion devices 1, as shown in FIG. 3.

In view of the above one or more embodiments, the disclosure may employ the signal conversion device to determine whether the identification code carried by the remote control signal matches the default identification code stored in the signal conversion device, to decide whether to convert the control command carried by the remote control signal to the control signal when the signal conversion device receives the remote control signal. Then, the signal conversion device may send the control signal to one or more electric devices, whereby the one or more electric devices may operate according to the control signal. In addition, since the control of most electric devices nowadays is based on the IR remote control, the casing of the signal conversion device in the disclosure may have a through-hole. Through the through-hole, when users intend to install the signal conversion device on the electric device, the signal conversion device may be aimed at the IR receiver of the electric device. This may increase the efficiency of installing the signal conversion device on the electric device. Moreover, since the IR receiver in the electric device may be exposed in the through-hole, users may be capable of controlling the electric device via the remote controller pertaining to the electric device.

In conclusion, even though the disclosure is applied to control a specific electric device out of many electric devices which are the same type or belong to the same brand in a certain environment, accidentally controlling another one of the other electric devices may not occur.

What is claimed is:

1. A remote control system, comprising:
- a remote electric device, configured to send out a remote control signal carrying an identification code and a control command; and
- at least one signal conversion device, comprising:
- a wireless receiving module, configured to receive the remote control signal;
- a control module, electrically connecting to the wireless receiving module and configured to determine whether the identification code matches a default identification code stored in the at least one signal conversion device, to decide whether to convert the control command into a control signal; and
- a wireless transmission module, electrically connecting to the control module and configured to send the control signal to an electric device, whereby the electric device operates according to the control signal,
- wherein the at least one signal conversion device is removable and disposed on the electric device, and a through-hole on the casing of the at least one signal conversion device is aligned with an infrared ray receiver in the electric device such that the infrared ray receiver is exposed in the through-hole.

2. The remote control system according to claim 1, wherein the control signal is an infrared ray signal.

3. The remote control system according to claim 2, wherein a light-transmissive film is located on at least one surface of the casing of the at least one signal conversion device, and a location of the light-transmissive film corresponds to a location of the through-hole.

4. The remote control system according to claim 1, wherein the remote control system further comprises a relay device configured to receive the remote control signal from the remote electric device and broadcast the remote control signal to the at least one signal conversion device in the remote control system by a wireless communication protocol.

5. The remote control system according to claim 1, wherein the at least one signal conversion device further comprises:
- a storage module, electrically connecting to the control module, and configured to store the default identification code and a lookup table which records a relationship between the control command and the control signal; and
- a power storage module, electrically connecting to the control module and configured to power the wireless receiving module, the control module, the wireless transmission module, and the storage module.

6. A signal conversion device for controlling an electric device according to a remote control signal which comprises an identification code and a control command, comprising:
- a wireless receiving module, configured to receive the remote control signal;
- a control module, electrically connecting to the wireless receiving module and configured to determine whether the identification code matches a default identification code stored in the signal conversion device, to decide whether to convert the control command to a control signal; and a wireless transmission module, electrically connecting to the control module and configured to send the control signal to the electric device, whereby the electric device operates according to the control signal, wherein the signal conversion device is removable and disposed on the electric device, and a through-hole on the casing of the signal conversion device is aligned with an infrared ray receiver in the electric device such that the infrared ray receiver is exposed in the through-hole.

7. The signal conversion device according to claim 6, wherein the control signal is an infrared ray signal.

8. The signal conversion device according to claim 7, wherein a light-transmissive film is located on at least one surface of the casing of the signal conversion device, and a location of the light-transmissive film corresponds to a location of the through-hole.

9. The signal conversion device according to claim 7, wherein the signal conversion device further comprises:

a storage module, electrically connecting to the control module and configured to store the default identification code and a lookup table that records a relationship between the control command and the control signal; and a power storage module, electrically connecting to the control module and configured to power the wireless receiving module, the control module, the wireless transmission module, and the storage module.

10. A control method for controlling an electric device via at least one signal conversion device removably disposed on the electric device, a through-hole on the casing of the at least one signal conversion device being aligned with an infrared receiver in the electric device such that the infrared ray receiver is exposed in the through-hole, comprising:

receiving a remote control signal carrying an identification code and a control command;

determining whether the identification code matches a default identification code stored in the at least one signal conversion device, to decide whether to convert the control command to a control signal; and sending the control signal to the electric device, whereby the electric device operates according to the control signal.

11. The control method according to claim 10, wherein the control signal is an infrared ray signal.

12. The control method according to claim 11, wherein a light-transmissive film is located on at least one surface of the casing of the at least one signal conversion device, and a location of the light-transmissive film corresponds to a location of the through-hole.

13. The control method according to claim 10, wherein the step of receiving the remote control signal further comprises broadcasting the remote control signal to the at least one signal conversion device via a relay device.

* * * * *